United States Patent [19]

Magerstedt et al.

[11] Patent Number: 5,665,832
[45] Date of Patent: Sep. 9, 1997

[54] FLAMEPROOFED THERMOPLASTIC MOULDINGS HAVING IMPROVED PROPERTIES

[75] Inventors: Herbert Magerstedt, Moers; Friedemann Paul, Bergisch Gladbach, both of Germany

[73] Assignee: Bayer Aktiengesellschaft

[21] Appl. No.: 745,814

[22] Filed: Nov. 12, 1996

[30] Foreign Application Priority Data

Nov. 20, 1995 [DE] Germany .................. 195 43 186.3

[51] Int. Cl.⁶ .................. C08F 20/00; C08K 5/00
[52] U.S. Cl. .................. 525/437; 525/439; 525/445; 524/81; 524/401; 524/777; 524/779; 524/789
[58] Field of Search .................. 525/437, 439, 525/445; 524/81, 401, 777, 779, 789

[56] References Cited

U.S. PATENT DOCUMENTS

| | | | |
|---|---|---|---|
| 4,954,542 | 9/1990 | Bohen et al. | 524/89 |
| 5,013,777 | 5/1991 | MacLeay et al. | 524/159 |
| 5,043,374 | 8/1991 | Bohen et al. | 524/288 |
| 5,086,098 | 2/1992 | Bohen et al. | 524/94 |
| 5,162,405 | 11/1992 | MacLeay et al. | 524/91 |
| 5,175,305 | 12/1992 | Roos et al. | 548/461 |

OTHER PUBLICATIONS

Kunststoffe 80 (1990), pp. 3 and 4.

Kunststoff-Handbuch, vol. VIII, p. 695 ff., Karl Hanser Verlag, Munich 1973).

*Primary Examiner*—Samuel A. Acquah
*Attorney, Agent, or Firm*—Connolly & Hutz

[57] ABSTRACT

The invention relates to thermoplastic moulding compositions based on polyalkylene terephthalate, disodium tetrabromophthalate and optionally glass fibres for the production of mouldings which show improved mechanical properties and at the same time a good flame-resistant behavior, without impairment of the thermoplastic matrix.

7 Claims, No Drawings

FLAMEPROOFED THERMOPLASTIC MOULDINGS HAVING IMPROVED PROPERTIES

The invention relates to thermoplastic moulding compositions based on polyalkylene terephthalate, disodium tetrabromophthalate and optionally glass fibres for the production of mouldings which show improved mechanical properties and at the same time a good flame-resistant behaviour, without impairment of the thermoplastic matrix.

As is known, for example, from the publication Kunststoffe 80 (1990), page 3 and 4, plastics such as thermosetting plastics, elastomers, polyamide, polycarbonate et cetera can be modified by the addition of halogenated hydrocarbons so as to be flame-retardant.

It may be inferred from the literature reference cited above that plastics parts which contain halogenated hydrocarbons have a good flame-retardant action but relatively poor mechanical properties.

It has been found that optionally glass fibre-reinforced polyalkylene terephthalate moulding compositions containing added disodium tetrabromophthalate result in mouldings having a high tracking resistance, a good flow behaviour with at the same time a good flame-resistant behaviour and other good properties, without impairment of the thermoplastic matrix. The moulding compositions are therefore also very suitable for the production of thin-walled mouldings and those of larger dimensions.

The present invention provides thermoplastic moulding compositions containing

A) from 25 to 97, preferably from 37 to 94, parts by weight of polyalkylene terephthalate,
B) from 3 to 20, preferably from 5 to 16, parts by weight of disodium tetrabromophthalate,
C) from 0 to 10, preferably from 1 to 7, parts by weight of antimony trioxide or antimony pentoxide and
D) from 0 to 45, preferably from 0 to 40, parts by weight of reinforcing agent, wherein the sum of A+B+C+D totals 100 and wherein up to 25 parts by weight, preferably 1 to 20 parts by weight, of polyalkylene terephthalate may be replaced by aromatic polycarbonate and/or graft polymer, and wherein from 1 to 10 parts by weight (referred to 100 parts by weight of the total weight) of polyolefins may be added.

Component A

Polyalkylene terephthalates according to the invention are reaction products of aromatic dicarboxylic acids or the reactive derivatives thereof (for example, dimethyl esters or anhydrides) and aliphatic, cycloaliphatic or araliphatic diols, and mixtures of these reaction products.

Preferred polyalkylene terephthalates can be prepared by known methods from terephthalic acid (or the reactive derivatives thereof) and aliphatic or cycloaliphatic diols having 2 to 10 C atoms (Kunststoff-Handbuch, Vol. VIII, page 695 ff., Karl Hanser Verlag, Munich 1973).

Preferred polyalkylene terephthalates contain at least 80 mol-%, preferably 90 mol-%, referred to the dicarboxylic acid component, of terephthalate groups and at least 80 mol-%, preferably at least 90 mol-%, referred to the diol component, of ethylene glycol groups and butanediol-1,4 groups.

The preferred polyalkylene terephthalates may contain, in addition to terephthalate esters, up to 20 mol-% of other aromatic dicarboxylic acids having 8 to 14 C atoms or aliphatic dicarboxylic acids having 4 to 12 C atoms, such as phthalate, isophthalate, naphthalene-2,6-dicarboxylate, 4,4'diphenyldicarboxylate, succinate, adipate, sebacate, azelate, cyclohexanediacetate groups.

The preferred polyalkylene terephthalates may contain, in addition to ethylene groups or butanediol-1,4-glycol groups, up to 20 mol-% of other aliphatic diols having 3 to 12 C atoms or cycloaliphatic diols having 6 to 21 C atoms, for example, groups of the diols propanediol-1,3, 2-ethylpropanediol-1,3, neopentyl glycol, pentanediol-1,5, hexanediol-1,6, cyclohexanedimethanol-1,4, 3-methylpentanediol-2,4, 2-methylpentanediol-2,4, 2,2,4-trimethylpentanediol-1,3 and -1,6,2-ethylhexanediol-1,3, 2,2-diethylpropanediol-1,3, hexanediol-2,5, 1,4-di(β-hydroxyethoxy)benzene, 2,2-bis(4-hydroxycyclohexyl) propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-OS 2 407 674, 2 407 776, 2 715 932).

The polyalkylene terephthalates can be branched by the incorporation of relatively small quantities of trihydric or tetrahydric alcohols or tribasic or tetrabasic carboxylic acids which are described, for example, in DE-OS 1 900 270 and U.S. Pat. Nos. 3,692,744. Examples of preferred branching agents are trimesic acid, trimellitic acid, trimethylolethane and trimethylolpropane and pentaerythritol.

It is advisable to use no more than 1 mol-% of the branching agent, referred to the acid component.

Particularly preferred are polyalkylene terephthalates which have been prepared exclusively from terephthalic acid and the reactive derivatives thereof (for example, the dialkyl esters thereof) and ethylene glycol and/or butanediol (polyethylene terephthalate and polybutylene terephthalate) and mixtures of these polyalkylene terephthalates.

Preferred polyalkylene terephthalates also include copolyesters prepared from at least two of the above-mentioned acid components and/or from at least two of the above-mentioned alcohol components; particularly preferred copolyesters are poly(ethylene glycol/butanediol-1,4) terephthalates.

The polyalkylene terephthalates used as component A generally have an intrinsic viscosity of from about 0.4 to 1.5 dl/g, preferably from 0.5 to 1.3 dl/g, in each case measured in phenol/o-dichlorobenzene (1:1 parts by weight) at 25° C.

A portion of the polyalkylene terephthalate component may be replaced by aromatic polycarbonate and optionally elastomeric polymers having a glass transition temperature of less than −20° C.

The addition according to the invention of reprocessed components of the thermoplastic moulding compositions is also possible, without the properties described being adversely affected. As a rule up to 25 parts by weight of the polyalkylene terephthalate can be replaced by reprocessed components of this mixture.

By aromatic polycarbonates according to the invention are meant homopolycarbonates and mixtures of these polycarbonates based, for example, on at least one of the following diphenols:

hydroquinone,
resorcinol,
dihydroxydiphenyls,
bis(hydroxyphenyl)alkanes,
bis(hydroxyphenyl) cycloalkanes,
bis(hydroxyphenyl) sulphides,
bis(hydroxyphenyl) ethers,
bis(hydroxyphenyl) ketones,
bis(hydroxyphenyl) sulphones,
bis(hydroxyphenyl) sulphoxides,
α,α'-bis(hydroxyphenyl)diisopropylbenzenes and the ring-alkylated and ring-halogenated derivatives thereof.

These and other suitable diphenols are described, for example, in U.S. Pat. Nos. 3,028,365, 2,999,835, 3,148,172, 2,275,601, 2,991,283, 3,271,367, 3,062,781, 2,970,131 and 2,999,846, in the Deutsche Offenlegungsschriften 1 570 703 2 063 050, 2 063 052, 2 211 956, 22 11 957, the French Patent Specifications 1 561 518 and in the monograph by H. Schnell, "Chemistry and Physics of Polycarbonates", Interscience Publishers, New York, 1964.

Examples of preferred diphenols are:
2,2-bis(4-hydroxyphenyl)propane,
1,1-bis(4-hydroxyphenyl)cyclohexane,
2,2-bis(3,5-dichloro-4-hydroxyphenyl)propane,
2,2-bis(3,5-dibromo-4-hydroxyphenyl)propane,
2,2-bis(3,5-dimethyl-4-hydroxyphenyl)propane,
Bis(3,5-dimethyl-4-hydroxyphenyl)methane,
Bis(4-hydroxyphenyl) sulphide,
1,1-bis(4-hydroxyphenyl)-3,3,5-trimethylcyclohexane.

The diphenols can be used both separately and as a mixture.

Particularly preferred aromatic polycarbonates are polycarbonates based on 2,2-bis(4-hydroxyphenyl)propane or one of the other preferred diphenols mentioned above. Most preferred are those based on 2,2-bis(4-hydroxyphenyl) propane, 2,2-bis(3,5-dimethyl-4-hydroxyphenyl)propane or 1,1-bis(4-hydroxyphenyl)-3,3,5-trimethylcyclohexane or mixtures of 2,2-bis(4-hydroxyphenyl)propane and 1,1-bis (4-hydroxyphenyl)-3,3,5-trimethylcyclohexane.

The aromatic polycarbonates can be prepared by known methods, for example, by melt transesterification of a corresponding bisphenol with diphenyl carbonate and in solution from bisphenols and phosgene. The solution may be homogeneous (pyridine process) or heterogeneous (two-phase interface process) (cf. H. Schnell, "Chemistry and Physics of Polycarbonates", Polymer Reviews, Vol. IX, page 33 ff., Interscience Publishers, 1964).

The aromatic polycarbonates as a rule have average molecular weights $M_w$ of about 10,000 to 200,000, preferably 20,000 to 80,000 (determined by gel chromatography after prior calibration).

Copolycarbonates according to the invention are in particular polydiorganosiloxane-polycarbonate block copolymers having an average molecular weight $M_w$ of about 10,000 to 200,000, preferably 20,000 to 80,000 (determined by gel chromatography after prior calibration) and a content of aromatic carbonate structural units of from about 75 to 97.5 wt. %, preferably 85 to 97 wt. %, and a content of polydiorganosiloxane structural units of from about 25 to 2.5 wt. %, preferably 15 to 3 wt. %, with the block copolymers being prepared starting from polydiorganosiloxanes containing α,ω-bis(hydroxyaryloxy) end groups and having a degree of polymerisation $P_n$ of from 5 to 100, preferably 20 to 80.

The polydiorganosiloxane-polycarbonate block copolymers can also be a mixture of polydiorganosiloxane-polycarbonate block copolymers together with conventional polysiloxane-free, thermoplastic polycarbonates, with the total content of polydiorganosiloxane structural units in this mixture amounting to about 2.5 to 25 wt. %.

These polydiorganosiloxane-polycarbonate block copolymers are characterised in that they contain in the polymer chain on the one hand aromatic carbonate structural units (1) and on the other hand polydiorganosiloxanes (2) containing aryloxy end groups,

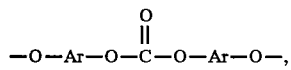
(1)

-continued

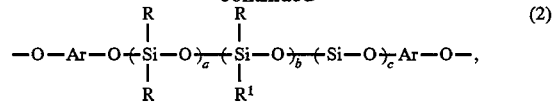
(2)

wherein

Ar represents identical or different aryl groups of diphenols and

R and $R^1$ are identical or different and signify linear alkyl, branched alkyl, alkenyl, halogenated linear alkyl, halogenated branched alkyl, aryl or halogenated aryl, but preferably methyl, and the number of diorganosiloxy units n equals a+b+c equals 5 to 10, preferably 20 to 50.

In formula (2) above alkyl is, for example, $C_1$-$C_{20}$ alkyl, in formula (2) above alkenyl is, for example, $C_2$-$C_6$ alkenyl; in formula (2) above aryl is $C_6$-$C_{14}$ aryl. The term halogenated in the above formula means partly or completely chlorinated, brominated or fluorinated.

Examples of alkyls, alkenyls, aryls, halogenated alkyls and halogenated aryls are methyl, ethyl, propyl, n-butyl, tert-butyl, vinyl, phenyl, naphthyl, chloromethyl, perfluorobutyl, perfluorooctyl and chlorophenyl.

Polydiorganosiloxane-polycarbonate block copolymers of this kind are known, for example, from U.S. Pat. No. 3,189,662, U.S. Pat. No. 3,821,325 and U.S. Pat. No. 3,832,419.

Preferred polydiorganosiloxane-polycarbonate block copolymers are prepared by reacting polydiorganosiloxanes containing α, ω-bis(hydroxyaryloxy) end groups together with other diphenols, optionally with the concomitant use of branching agents in the conventional quantities, for example, by the two-phase interface process (on this, see H. Schnell, "Chemistry and Physics of Polycarbonates", Polymer Rev., Vol. IX, page 27 ff., Interscience Publishers, New York, 1964), with the ratio of the bifunctional phenolic reactants in each case being so chosen that the content of aromatic carbonate structural units and diorganosiloxy units according to the invention results therefrom.

Polydiorganosiloxanes of this kind containing α, ω-bis (hydroxyaryloxy) end groups are known, for example, from U.S. Pat. No. 3,419,634.

The elastomeric polymers include copolymers—in particular graft copolymers—having elastomeric properties, which are substantially obtainable from at least two of the following monomers:

chloroprene, isoprene, isobutene, butadiene, styrene, acrylonitrile, ethylene, propylene, vinyl acetate and (meth)acrylic esters having 1 to 18 C atoms in the alcohol component; that is, polymers such as are described, for example, in "Methoden der organischen Chemie" (Houben-Weyl), Vol. 14/1, Georg Thieme Verlag, Stuttgart, 1961, pages 393–406 and in C.B. Bucknail, "Toughened Plastics", Appl. Science Publishers, London, 1977. The polymers have a gel content of above 20 wt. %, preferably of above 40 wt. %. The glass transition temperature (Tg) is below −20° C.

Preferred polymers are selectively hydrogenated block copolymers of a vinyl aromatic monomer (X) and a conjugated diene (Y) of the X-Y type. These block copolymers can be prepared by known methods.

In general the technology used for the preparation of styrene-butadiene block copolymers, which is described on pages 508 ff. in "Encyclopedia of Polymer Science and Technology", Vol. 15, Interscience, N.Y. (1971), can be employed for the preparation of the appropriate X-Y block copolymers from styrene, α-methylstyrene, vinyltoluene et cetera and from conjugated dienes, such as butadiene, isoprene et cetera. Selective hydrogenation can be carried out by known per se methods and means that the ethylenic double bonds are substantially completely hydrogenated with the aromatic double bonds remaining substantially unaffected.

Selectively hydrogenated block copolymers of this kind are described, for example, in DE-OS 3 000 282.

Preferred polymers are, for example, polybutadienes, butadiene-styrene copolymers and poly(meth)acrylic esters, grafted with styrene and/or acrylonitrile and/or (meth) acrylic alkyl esters, for example, copolymers of styrene or alkylstyrene and conjugated dienes (impact-resistant polystyrene), that is, copolymers of the kind described in DE-OS 1 694 173 (equivalent to U.S. Pat. No. 3,564,077), polybutadienes grafted with acrylic ester or methacrylic ester, with vinyl acetate, with acrylonitrile, with styrene and/or alkylstyrenes, butadiene-styrene or butadiene-acrylonitrile copolymers, polyisobutenes or polyisoprenes, which are described, for example, in DE-OS 2 348 377 (equivalent to U.S. Pat. No. 3,919,353) or in DE-A 3 105 364 and DE-A 3 019 233.

Particularly preferred polymers are, for example, ABS polymers (both mixed and grafted types), which are described, for example, in DE-OS 2 035 390 (equivalent to U.S. Pat. No. 3,644,574) or in DE-OS 2 248 242 (equivalent to GB-PS 1 409 275).

Moreover particularly preferred polymers are graft polymers obtainable by the grafting reaction of I. from 10 to 40 wt. %, preferably 10 to 35 wt. %, referred to the graft product, of at least one (meth)acrylic ester and/or of a mixture comprising 10 to 40 wt. %, preferably 20 to 35 wt. %, referred to the mixture, of acrylonitrile and from 60 to 90 wt. %, preferably 65 to 80 wt. %, referred to the mixture, of styrene on II. from 60 to 90 wt. %, preferably 65 to 90 wt. %, referred to the graft product, of a butadiene polymer having at least 70 wt. %, referred to II, of butadiene groups as the graft backbone.

The gel content of the graft backbone II is preferably ≧70% (measured in toluene), the degree of grafting G is 0.15 to 0.55 and the average particle diameter $d_{50}$ of the graft polymer C is from 0.2 to 0.6 μm, preferably 0.3 to 0.5 μm (cf., for example, EP 0 131 202).

(Meth)acrylic esters I are esters of acrylic acid or methacrylic acid and monohydric alcohols having 1 to 8 C atoms.

The graft backbone II may contain, in addition to butadiene groups, up to 30 wt. %, referred to II, of groups of other ethylenically unsaturated monomers such as, for example, styrene, acrylonitrile, esters of acrylic acid and methacrylic acid having 1 to 4 C atoms in the alcohol component (such as methyl acrylate, ethyl acrylate, methyl methacrylate, ethyl methacrylate). The preferred graft backbone II consists of pure polybutadiene.

Since, as is generally known, the graft monomers I are not completely grafted onto the graft backbone II during the grafting reaction, according to the invention by graft polymers are also meant those products which, in addition to the actual graft polymers, also contain homopolymers and copolymers of the graft monomers I employed.

The degree of grafting G is the weight ratio of grafted graft monomers to graft backbone and is dimensionless.

The average particle size $d_{50}$ is the diameter above and below which 50 wt. % respectively of the particles lie. It can be determined by means of ultra-centrifugation measurements (W. Scholtan, H. Lange, Kolloid, Z. and Z. Polymere 250, (1972), 782–796) or by means of electron microscopy and subsequent counting of particles (C. Kämpf, H. Schuster, Angew. Makromolekulare Chemie 14, (1970), 111–129) or by means of light-scattering measurements.

Particularly preferred elastomeric polymers are also, for example, graft polymers of a) from 25 to 98 wt. %, referred to 100 wt. % of graft polymer, of acrylic rubber having a glass transition temperature of below −20° C. as the graft backbone and b) from 2 to 75 wt. %, referred to 100 wt. % of graft polymer, of at least one polymerisable, ethylenically unsaturated monomer, whereof the homopolymers or copolymers formed in the absence of a) would have a glass transition temperature of 25° C., as graft monomers.

The acrylic rubbers (a) are preferably polymers of acrylic alkyl esters, optionally containing up to 40 wt. % of other polymerisable, ethylenically unsaturated monomers. If the acrylic rubbers used as graft backbone (a)—as described below—are for their part already graft products having a diene rubber core, the diene rubber core is not taken into account in the calculation of this percentage data. The preferred polymerisable acrylic esters include $C_1$–$C_8$ alkyl esters, for example, methyl, ethyl, butyl, octyl and 2-ethylhexyl esters; haloalkyl esters, preferably halo-$C_1$–$C_8$ alkyl esters, such as chloroethyl acrylate and aromatic esters such as benzyl acrylate and phenethyl acrylate. They may be used individually or as a mixture.

The acrylic rubber (a) may be uncross-linked or cross-linked, and is preferably partially cross-linked.

Monomers having more than one polymerisable double bond can be copolymerised to effect cross-linking. Preferred examples of cross-linking monomers are esters of unsaturated monocarboxylic acids having 3 to 8 C atoms or saturated polyols having 2 to 4 OH groups and 2 to 20 C atoms such as, for example, ethylene glycol dimethacrylate, allyl methacrylate, polyunsaturated heterocyclic compounds such as, for example, trivinyl cyanurate and isocyanurite and triallyl cyanurate and isocyanurate, tris(acryloyl)-s-triazines, in particular triallyl cyanurate; poly-functional vinyl compounds such as divinylbenzene and trivinylbenzene, and also triallyl phosphate and diallyl phthalate.

Preferred cross-linking monomers are allyl methacrylate, ethylene glycol dimethacrylate, diallyl phthalate and heterocyclic compounds having at least three ethylenically unsaturated groups.

Particularly preferred cross-linking monomers are the cyclic monomers triallyl cyanurate, triallyl isocyanurate, trivinyl cyanurate, tris(acryloyl)hexahydro-s-triazine, triallylbenzenes.

The quantity of cross-linking monomers is preferably from 0.02 to 5 wt. %, in particular from 0.05 to 2 wt. %, referred to the graft backbone (a).

When cyclic cross-linking monomers having at least three ethylenically unsaturated groups are used, it is advantageous to limit the quantity to less than 1 wt. % of the graft backbone (a).

Preferred "other" polymerisable, ethylenically unsaturated monomers which may optionally be used in addition to the acrylic esters for the preparation of the graft backbone (a) are, for example, acrylonitrile, styrene, α-methylstyrene, acrylamides, vinyl $C_1$–$C_6$-alkyl ethers. Emulsion polymers having a gel content of ≧60 wt. % are preferred acrylic rubbers for use as graft backbone (a).

The gel content of the graft backbone (a) is determined in dimethylformamide at 25° C. (M. Hoffmann, H. Krämer, R.

Kuhn, Polymeranalytik I and II, Georg Thieme Verlag, Stuttgart, 1977).

Acrylic rubbers used as the graft backbone (a) may also be products which contain as a core a cross-linked diene rubber consisting of one or more conjugated dienes, such as polybutadiene, or a copolymer of a conjugated diene together with an ethylenically unsaturated monomer, such as styrene and/or acrylonitrile.

The quantity of polydiene core in the graft backbone (a) can be from 0.1 to 80 wt. %, preferably from 10 to 50 wt. %, referred to (a). Shell and core may independently of one another be uncross-linked, partly cross-linked or highly cross-linked.

Most preferred are the above-mentioned graft polymers made from polybutadiene as graft backbone and (meth) acrylic ester and acrylonitrile as grafted component, wherein the graft backbone consists of from 65 to 90 wt. % of cross-linked polybutadiene having a gel content of above 70% (in toluene) and the grafted component consists of a 5:1 to 20:1 mixture of methyl methacrylate and n-butyl acrylate (for example, DE 3 105 364, DE 3 019 233).

Components B and C

Disodium tetrabromophthalate

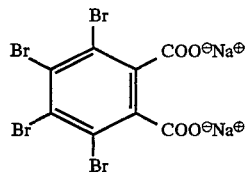

is a universally known compound.

Antimony trioxide and antimony pentoxide are likewise universally known compounds.

Component D

Reinforcing fillers are suitable as reinforcing agents. In this connection fibrous materials are preferred, in particular glass fibres, having a fibre diameter of between about 8 and 14 μm.

The glass fibres can be used as continuous fibres or as chopped or milled glass fibres and it is possible to treat the fibres with a suitable sizing system and a bonding agent or system of bonding agents based on silane.

Other fibrous reinforcing materials such as carbon fibres, K titanate single-crystal fibres, gypsum fibres, aluminium oxide fibres or asbestos can however also be incorporated. Non-fibrous fillers such as, for example, glass spheres, hollow glass spheres or chalk, quartz, natural and calcined kaolin are preferred and equally combinations of these materials with glass fibres. These fillers may, like the glass fibres, also be provided with a size and/or a bonding agent or system of bonding agents.

In particular glass fibres are used.

The thermoplastic moulding compositions may contain from 1 to 10 parts by weight, in particular 2 to 8 parts by weight (referred to 100 parts by weight of the total weight) of polyolefins. Suitable polyolefins are polymers of aliphatic unsaturated hydrocarbons such as, for example, ethylene, propylene, butylene or isobutylene, which are obtained by conventional methods, for example, radical polymerisation, and have weight average molecular weights $M_w$ (measured by methods using gel chromatography) of between 3,000 to 3,000,000. Both high pressure and low pressure polyolefins can be used. Polyethylenes and polypropylenes are preferred.

The moulding compositions may contain nucleating agents such as microtalc. The moulding material can additionally contain conventional additives such as lubricants and mould release agents, processing stabilisers as well as dyes and pigments.

Mouldings produced from the moulding compositions can constitute components from the electrical sector, for which a high tracking resistance and good flow behaviour and at the same time a good time-resistant behaviour without impairment of the thermoplastic matrix are required. Thus, for example, parts of housings, plug covers and light sockets as well as parts for the automobile sector are practicable.

The components are mixed together subsequently compounded by means of an extruder, and processed into moulded parts in an injection-moulding machine under processing conditions conventional for polyalkylene terephthalates (temperature of the materials about 260° C. for polybutylene terephthalate, for polyethylene terephthalate about 270° C.). The components given in the Examples are also mixed, extruded and processed to form test pieces in a corresponding manner.

| Example 1A (according to the invention) | |
|---|---|
| 54.82 wt. % | Polybutylene terephthalate (PBT) Intrinsic viscosity 0.900–0.950 |
| 30.00 wt. % | Glass fibres Type OC 29 R (Owens/Corning) |
| 10.00 wt. % | Disodium tetrabromophthalate (FR 756) Great Lakes Company |
| 4.50 wt. % | Antimony trioxide |
| 0.68 wt. % | Additives (processing agents, stabilisers) |

| Example 1B (Comparison with Example 1A) | |
|---|---|
| 54.82 wt. % | Polybutylene terephthalate (PBT) Intrinsic viscosity 0.900–0.950 |
| 30.00 wt. % | Glass fibres Type OC 29 R (Owens/Corning) |
| 10.00 wt. % | Tetrabromobisphenol oligocarbonate (Great Lakes BC 52 HP) |
| 4.50 wt. % | Antimony trioxide |
| 0.68 wt. % | Additives (processing agents, stabilisers) |

| Example 2A (according to the invention) | |
|---|---|
| 62.6 wt. % | Polyethylene terephthalate, Schwarze Company |
| 25.0 wt. % | Glass fibres Type CS 7962 (BAYER AG) |
| 8.5 wt. % | Disodium tetrabromophthalate (vide supra) |
| 2.0 wt. % | Antimony trioxide |
| 0.5 wt. % | Zinc sulphide |
| 1.4 wt. % | Additives (processing agents, stabilisers) |

| Example 2B (according to the invention) | |
|---|---|
| 59.1 wt. % | Polyethylene terephthalate (Schwarze Company) |
| 25.0 wt. % | Glass fibres Type CS 7962 (Bayer AG) |
| 12.0 wt. % | Disodium tetrabromophthalate |
| 2.0 wt. % | Antimony trioxide |
| 0.5 wt. % | Zinc sulphide |
| 1.4 wt. % | Additives (processing agents, stabilisers) |

| Example 2C (Comparison with Examples 2A and 2B) | |
|---|---|
| 62.6 wt. % | Polyethylene terephthatate (Schwarze Company) |
| 25.0 wt. % | Glass fibres Type CS 7962 (Bayer AG) |
| 8.5 wt. % | Ethylene bis-tetrabromophthalimide (Saytex BT 93 white, Ethyl Company) |
| 2.0 wt. % | Antimony trioxide |
| 0.5 wt. % | Zinc sulphide |
| 1.4 wt. % | Additives (processing agents, stabilisers) |

| Example 3A (according to the invention) | |
|---|---|
| 68.8 wt. % | Polybutylene terephthalate Intrinsic viscosity 1.135–1.210 |
| 12.0 wt. % | ABS graft rubber |
| 15.0 wt. % | Disodium tetrabromophthalate |
| 3.0 wt. % | Antimony trioxide |
| 1.2 wt. % | Additives (processing agents, stabilisers) |

| Example 3B (Comparison with Example 3A) | |
|---|---|
| 73.4 wt. % | Polybutylene terephthalate Intrinsic viscosity 1.135–1.210 |
| 12.0 wt. % | ABS graft rubber |

-continued

| | | |
|---|---|---|
| 10.5 wt. % | Ethylene bis-tetrabromophthalimide (Saytex BT 93 white, Ethyl Company) | |
| 3.0 wt. % | Antimony trioxide | |
| 1.1 wt. % | Additives (processing agents, stabilisers) | |

The ABS graft rubber used is a graft polymer consisting of 25 wt. % of a styreneacrylonitrile mixture in the weight ratio of 72:28 on 75 wt. % of particulate polybutadiene having an average particle size ($d_{50}$) of 0.4 gin, obtained by emulsion polymerisation.

DESCRIPTION OF THE TEST METHODS

Comparative tracking index (CTI), test solution A in accordance with IEC 112

Flame test in accordance with UL 94/IEC 707 FV

I5 Temperature of deflection under load (HDT/Af at 1.8 N/mm2) in accordance with ISO/DIS 75

Flexural test at v=5 mm/min in accordance with ISO 178

Flexural modulus at v=2 mm/min in accordance with ISO 178

Tensile test at v=5 mm/min in accordance with ISO 527

Modulus of elasticity of elongation at v=1 mm/min in accordance with ISO 527

Izod impact strength at 23° C., in accordance with ISO 180/1 A

Melt Volume-flow rate (MVR) in accordance with ISO 1133

TABLE 1

| Properties | Dimension | Example 1A according to the invention | Example 1B Comparison |
|---|---|---|---|
| CTI A | Stage | 225 | 175 |
| Flame test by UL | | | |
| 1.6 mm | Class | V0 | V0 |
| 0.8 mm | Class | V2 | V2 |
| Flexural strength | MPa | 242 | 234 |
| Flexural Modulus | MPa | 10,500 | 10,000 |
| MVR 260° C./2.16 kg | cm³/10 min | 11.3 | 8.5 |
| Impact strength | kJ/m² | 51 | 48 |

The Example 1A according to the invention shows a better tracking resistance, flexural strength, flexural modulus and flow behaviour than does the Comparative Example 1B.

TABLE 2

Flameproofed thermoplastic moulding compositions having good flow properties and good heat deflection temperature

| Properties | Dimension | Example 2A according to the invention | Example 2B according to the invention | Example 2C Comparison |
|---|---|---|---|---|
| HDT A (ISO 75) | °C. | 234 | 233 | 231 |
| Flame test by UL | | | | |
| 1.6 mm | Class | V0 | V0 | did not pass |
| 0.8 mm | Class | V2 | V0 | did not pass |
| MVR 270° C./5 kg | cm³/10 min | 62.0 | 59 | 54 |

The Example 2A according to the invention shows a distinctly better temperature of deflection, flow behaviour and V2 at 0.8 mm and V0 at 1.6 mm wall thickness respectively as regards flameproofing than does the Comparative Example 2C. The Example 2B according to the invention shows a better heat deflection temperature, flow behaviour and V0 at 0.8 mm and 1.6 mm wall thickness as regards flameproofing than does the Comparative Example 2C.

TABLE 3

Flameproofed thermoplastic moulding compositions having high tensile, stress and strength values and at the same time good moduli of elasticity

| Properties | Dimension | Example 3A according to the invention | Example 3B Comparison |
|---|---|---|---|
| Yield stress | MPa | 46 | 43 |
| Tensile strain at break | % | 45 | 20 |
| Tensile Modulus | MPa | 2715 | 2365 |
| Flexural stress | MPa | 77 | 67 |
| Flexural Modulus | MPa | 2550 | 2230 |
| Flame test by UL 1.6 mm | Class | V0 | V0 |

The Example according to the invention 3A shows a better tensile strain at break, increased flexural stress and moduli of elasticity than does the Comparative Example 3B.

We claim:

1. Thermoplastic moulding compositions, containing
   A) from 25 to 97 parts by weight of polyalkylene terephthalate,
   B) from 3 to 20 parts by weight of disodium tetrabromophthalate,
   C) from 0 to 10 parts by weight of antimony trioxide or antimony pentoxide and
   D) from 0 to 45 parts by weight of reinforcing agent, wherein the sum of A+B+C+D totals 100 and wherein up to 25 parts by weight of polyalkylene terephthalate may be replaced by aromatic poly-carbonate and/or graft polymer, and wherein from 1 to 10 part by weight (referred to 100 parts by weight of the total weight) of polyolefins may be added.

2. Thermoplastic moulding compositions according to claim 1, wherein the graft polymers consist of at least two monomers selected from chloroprene, isoprene, isobutene, butadiene, styrene, acrylonitrile, ethylene, propylene, vinyl acetate and (meth)acrylic esters having 1 to 18 C atoms in the alcohol component.

3. Thermoplastic moulding compositions according to claim 1, wherein the graft polymers are polybutadienes, butadiene-styrene copolymers or poly(meth)acrylic esters, copolymers of styrene or alkylstyrene and conjugated dienes, grafted with styrene and/or acrylonitrile and/or (meth)acrylic alkyl esters.

4. Thermoplastic moulding compositions according to claim 1 which contain conventional additives.

5. Thermoplastic moulding compositions according to claim 4, wherein the additives are selected from the list of lubricants and mould release agents, processing agents, dyes and pigments.

6. Process for the production of mouldings comprising the composition of claim 1.

7. Mouldings produced from thermoplastic moulding compositions according to claim 1.

* * * * *

UNITED STATES PATENT AND TRADEMARK OFFICE
CERTIFICATE OF CORRECTION

PATENT NO. : 5,665,832
DATED : September 9, 1997
INVENTOR(S) : Herbert Magerstedt, et. al.

It is certified that error appears in the above-identified patent and that said Letters Patent is hereby corrected as shown below:

Column 9, line 10, "gin" should read -- µm --; and line 18, "15" should be deleted.

Column 10, line 38 (claim 1, line 12), "part" should read -- parts --.

Signed and Sealed this

Sixteenth Day of December, 1997

Attest:

BRUCE LEHMAN

Attesting Officer

Commissioner of Patents and Trademarks